US008743222B2

(12) United States Patent
Hamalainen

(10) Patent No.: US 8,743,222 B2
(45) Date of Patent: Jun. 3, 2014

(54) METHOD AND APPARATUS FOR CROPPING AND STABILIZATION OF VIDEO IMAGES

(75) Inventor: Matti Sakari Hamalainen, Lempaala (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 13/372,635

(22) Filed: Feb. 14, 2012

(65) Prior Publication Data
US 2013/0208134 A1  Aug. 15, 2013

(51) Int. Cl.
*H04N 5/228* (2006.01)
*H04N 11/00* (2006.01)

(52) U.S. Cl.
USPC ..................... 348/208.99; 348/497

(58) Field of Classification Search
USPC ......................... 348/208.99, 222.1
See application file for complete search history.

(56) References Cited

U.S. PATENT DOCUMENTS

| 7,705,884 B2* | 4/2010 | Pinto et al. ............... 348/208.99 |
| 2006/0120615 A1 | 6/2006 | Wang et al. ................... 382/254 |
| 2008/0165280 A1* | 7/2008 | Deever et al. .................. 348/497 |
| 2009/0237516 A1 | 9/2009 | Jayachandra et al. ..... 348/208.4 |
| 2011/0141219 A1 | 6/2011 | Yeh ............................. 348/14.02 |
| 2011/0151925 A1 | 6/2011 | Johansson .................. 455/556.1 |
| 2012/0127329 A1* | 5/2012 | Voss et al. .................. 348/208.4 |

FOREIGN PATENT DOCUMENTS

WO    WO-2011065960 A1    6/2011

OTHER PUBLICATIONS

Multiple View Geometry in Computer Vision, Richard Hartley et al, Chapter 4 "Estimation—2D Projective Transformations", (2004), pp. 87-131.
Chen, H., et al.: "Integration of digital stabilizer with video codec for digital video cameras", IEEE Trans. on Circuits and Systems for Video Technology, vol. 17, No. 7, pp. 801-813, Jul. 2007.

* cited by examiner

*Primary Examiner* — Twyler Haskins
*Assistant Examiner* — Padma Haliyur
(74) *Attorney, Agent, or Firm* — Harrington & Smith

(57) ABSTRACT

A method including receiving cropping information for a current video frame; capturing at a camera sensor the current video frame; performing a first crop of the current video frame using a first cropping window to form a cropped video frame, wherein the first cropping window has been dynamically adjusted in response to the received cropping information; and sending the cropped video frame for digital image stabilization.

21 Claims, 6 Drawing Sheets

METHOD AND APPARATUS FOR CROPPING AND STABILIZATION OF VIDEO IMAGES

TECHNOLOGICAL FIELD

Embodiments of the present invention relate to enabling better image stabilization.

BACKGROUND

Image stabilization methods can be divided into two categories optical and digital.

Digital Image Stabilization (DIS) methods use digital signal processing methods to remove unwanted global motion from a captured image sequence. The processing removes motion artifacts introduced by unwanted movement of a camera relative to the captured scene.

BRIEF SUMMARY

According to various, but not necessarily all, embodiments of the invention there is provided a method comprising: receiving cropping information for a current video frame; capturing at a camera sensor the current video frame; performing a first crop of the current video frame using a first cropping window to form a cropped video frame, wherein the first cropping window has been dynamically adjusted in response to the received cropping information; and sending the cropped video frame for digital image stabilization.

According to various, but not necessarily all, embodiments of the invention there is provided an apparatus comprising: a camera sensor configured to capture a current video frame; cropping circuitry configured:

to receive cropping information for the current video frame;

to define a first cropping window in response to the cropping information;

to crop the current video frame using the first cropping window to form a cropped video frame; and to send the cropped video frame for digital image stabilization.

According to various, but not necessarily all, embodiments of the invention there is provided an apparatus comprising: at least one processor; and at least one memory including computer program code, the at least one memory and the computer program code configured to, with the at least one processor, cause the camera module at least to perform for each video frame in a series of video frames:

receiving cropping information for a current video frame;

dynamically adjusting a first cropping window in response to the cropping information;

performing a first crop of the current video frame using the first cropping window to form a cropped video frame; and sending the cropped video frame for digital image stabilization.

According to various, but not necessarily all, embodiments of the invention there is provided a method comprising:

receiving, at a camera module, cropping information for a video frame;

obtaining, at the camera module, a cropped video frame; and sending the cropped video frame for digital image stabilization.

According to various, but not necessarily all, embodiments of the invention there is provided a method comprising:

receiving cropping information for a video frame;

capturing at a camera sensor a cropped video frame;

sending the cropped video frame for digital image stabilization.

BRIEF DESCRIPTION

For a better understanding of various examples of embodiments of the present invention reference will now be made by way of example only to the accompanying drawings in which.

DETAILED DESCRIPTION

In wearable camera systems a camera is not always held in a hand. There is therefore no articulated stabilization by movement of the hand relative to a user's body. Digital image stabilization therefore needs to compensate for extreme camera movement associated with the user's body movements.

In some use cases a user may be focused on an activity, for example a sport, other than video recording and the user's body movements may be dictated by the user activity rather than maintaining stability of the camera. In fact it may be desirable for the user to concentrate entirely on the activity.

The inventors have realized that there is a need for more robust digital image stabilization.

This may be enabled by using a high resolution (high pixel count) camera sensor that is able to support extensive cropping and still maintain sufficient resolution (pixel count) for an output video frame and by using pre-emptive, adaptive cropping of the video frame to reduce its resolution (pixel count) before performing digital image stabilization.

If the video frame were not cropped before digital image stabilization, there would be increased costs because of an increased bandwidth associated with transport, processing and storing high resolution (pixel count) video frames.

Figure 1:
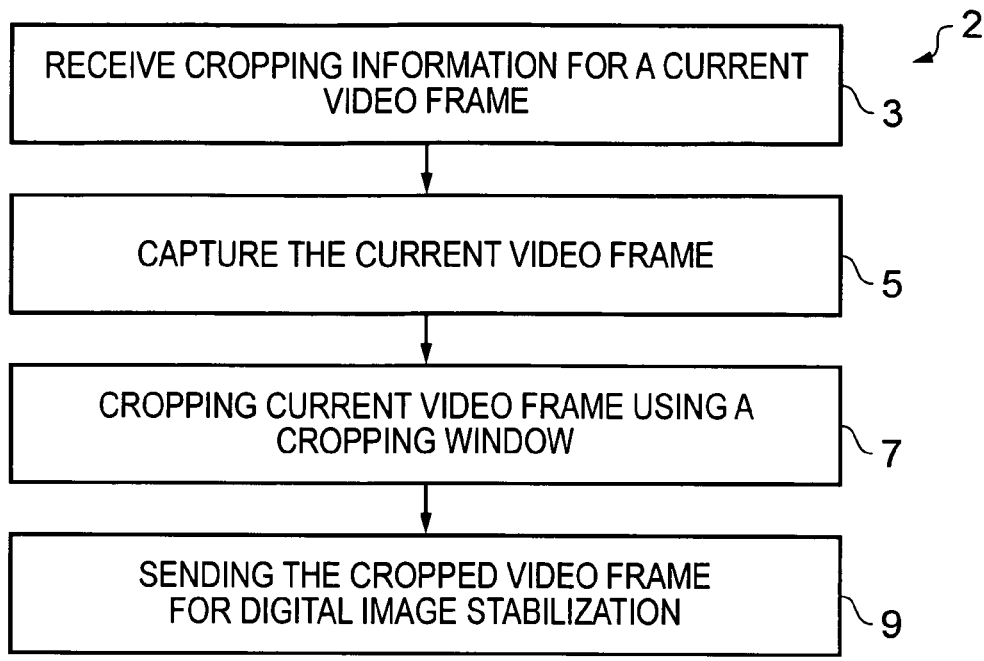
FIG. 1 illustrates an example of a method for processing a captured video frame prior to digital image stabilization.

FIG. 1 illustrates an example of a method 2 for processing a captured video frame prior to digital image stabilization. The method 10 comprises: at block 3, receiving cropping information 4 for a current video frame 10; at block 5, capturing at a camera sensor 22 the current video frame 10; at block 7, performing a first crop of the current video frame 10 using a first cropping window 11 to form a cropped video frame 12, wherein the first cropping window 11 has been dynamically adjusted in response to the received cropping information 4; and at block 9, sending the cropped video frame 12 for digital image stabilization 66.

The cropping information 4 may estimate a cropping window 11 for the current video frame 10 based on historic video frame(s) instead of the current video frame 10. The cropping information 4 may therefore be dependent upon one or more preceding video frames but not the current video frame 10. The use of historic video frame(s) instead of the current video frame 10 allows cropping of the current video frame 10 to occur without having to transport, process and store the whole of the current video frame 10.

The method 2 is repeated for each video frame in a series of video frames.

Figure 2:
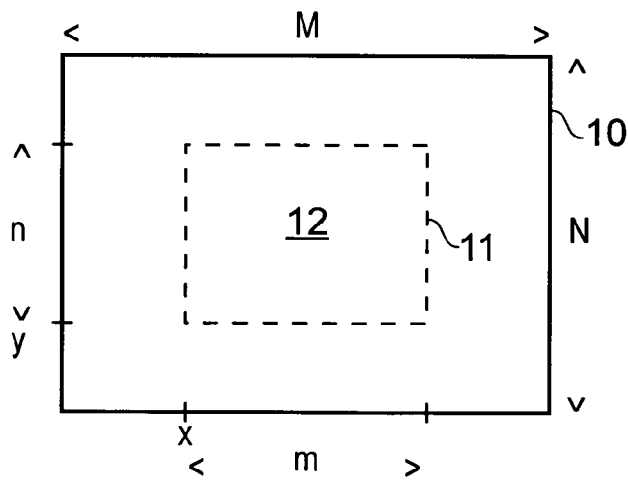
FIG. 2 illustrates an example of a video frame and a cropped video frame.

FIG. 2 illustrates an example of a current video frame 10. The current video frame 10 has a width M pixels and a height N pixels.

FIG. 2 also illustrates a first cropping window 11. This cropping window 11 is positioned at coordinate (x, y) within the current video frame 10 and it has a width m pixels and a height n pixels. The cropped video frame 12 is that portion of the current video frame 10 that lies within the first cropping window 11.

The field of view of the cropped video frame 12 is determined by the size (m×n) of the cropping window 11 and the optical characteristics of the camera relative to the cropping area.

The content of the cropped video frame 12 is determined by the size (m×n) of the cropping window 11 and the position (x, y) of the cropping window 11.

A video frame in a series of captured video frames is 'current' just after it has been captured. It is the latest video frame available for processing. Each current video frame 10 is associated with its own cropping information 4 which may estimate a cropping window 11 for the associated current video frame 10 based on historic video frame(s).

As the history for each current frame 10 is different, each current frame 10 may be cropped using a different cropping window 11. The cropping window 11 may therefore be adjusted dynamically for each video frame in a series of video frames.

The dynamic adjustment of a cropping window 11 during a series of video frames 10 may, for example, involve adjusting a position (x, y) of the first cropping window 11 in response to the cropping information 4.

The dynamic adjustment of a cropping window 11 during a series of video frames 10 may, for example, involve adjusting a size (m×n) of the cropping window 11 in response to the cropping information 4.

The cropping window 11 may be constrained to be less than a defined threshold fraction of a size of the current video frame 10. This constraint may be chosen to prevent the demands required for transporting, processing or storing the cropped video frame 12 becoming too large.

The first cropping window 11 may, for example, be less than ¼ the size of the current video frame 10, less than $1/9^{th}$ the size of the current video frame 10 or even smaller.

The cropping information 4 may define the size of the first cropping window 11 so that it is expected to be sufficiently larger than a region of interest within the current video frame 10 to enable digital image stabilization of the region of interest using the cropped video frame 12.

The cropping information 4 may also define a size of the first cropping window 11 so that it is expected to be sufficiently larger than the region of interest to enable metadata to be displayed adjacent the region of interest.

The cropping information 4 may also depended in image scaling parameters in case the video frames are scaled to a different resolution by the camera module 20.

Figure 4:
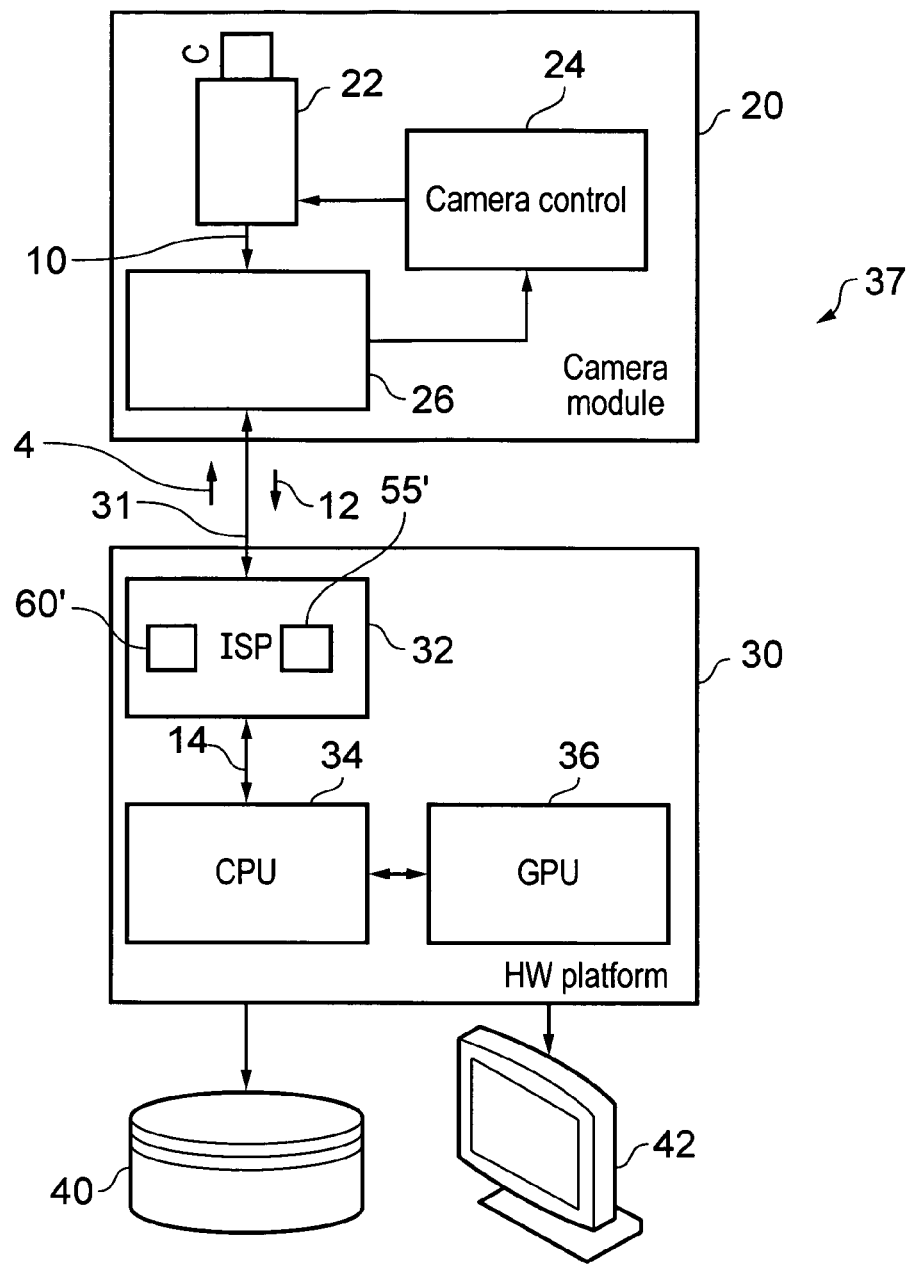
FIG. 4 illustrates an example of a system comprising a camera module and a host apparatus.

FIG. 4 illustrates an example of a system 37 comprising a camera module 20 and a host apparatus 30. In some but not necessarily all embodiments the system 37 may be a wearable video camera system.

Image capture and low level image processing can take place in camera module 20.

The camera module 20, in this example, comprises: a camera sensor 22 configured to capture a current video frame 10; an interface 31 configured to receive cropping information 4 for a current video frame 10 from a host apparatus; and cropping circuitry 26 configured to crop the current video frame 10 using a first cropping window 11 to form a cropped video frame 12, wherein the first cropping window 11 has been dynamically adjusted in response to the received cropping information 4 and configured to send, via the interface 31, the cropped video frame 12 for digital image stabilization in the host apparatus 30.

The camera sensor 22 may be a high resolution image sensor that is able to support extensive cropping and still maintain sufficient resolution for the proper display of the cropped video frame 12. For example, the camera sensor may have in excess of 30 million pixels.

In the illustrated example, a single interface 31 interconnects the camera module 20 and the host apparatus 30. This single physical interface 31 provides both an input interface 58 for transfer of the cropping information 4 and an output interface 57 for transfer of the cropped video frame 12. In other embodiments, the input interface 58 and the output interface 57 may be physically separated.

The camera module 20, in this example, also comprises camera control circuitry 24 configured to control video frame capture at the camera sensor 22.

The camera module 20 can output either raw video frame data or in some cases a compressed stream of video frames.

The host apparatus 30 is configured to provide the cropping information 4 to the camera module 20 and to receive the cropped video frame 12 from the camera module 20. The host apparatus 30 is configured to perform digital image stabilization on the received cropped video frame 12.

Figure 3:
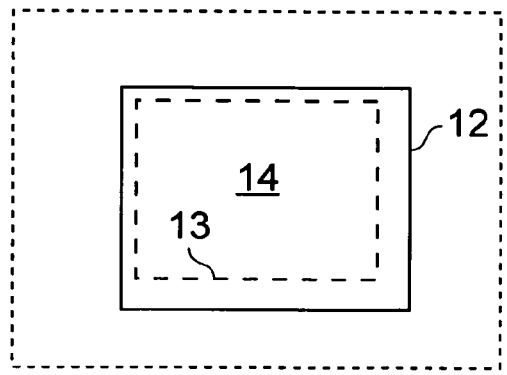
FIG. 3 illustrates an example of a cropped video frame and a double-cropped video frame.

The host apparatus 30 is configured to perform, as part of digital image stabilization processing, a crop of the cropped video frame 12 using a second cropping window 13 to form a double-cropped video frame 14. The cropping of the cropped video frame 12 to form the double-cropped video frame 14 is illustrated in FIG. 3.

The host apparatus 30 is configured to determine the crop of the cropped video frame 12 by analyzing the cropped video frame 10 itself. The position and/or size of the second cropping window 13 may be dynamically adjusted, video frame by video frame. Typically, the size and position of the second cropping window 13 is determined to make sure a region of interest remains within and perhaps centrally located within the double-cropped video frame 14.

Digital processing techniques that may be used to track a region of interest are well document. See, for example, "Multiple View geometry in computer vision" by Richard Hartley et al ($2^{nd}$ edition, Ch 4) and other textbooks.

The host apparatus 30 is configured to re-use the processing performed to identify the second cropping window 13 to generate the cropping information 4 for the next video frame. The cropping information 4 may, for example, identify the second cropping window 13 used now in digital image stabilization. This cropping information is then used to crop a subsequent current video frame 10.

The position and/or size of the second cropping window 13 may be dynamically adjusted frame-by-frame. In response, the position of the first cropping window 11 may also be similarly dynamically adjusted, with a lag.

The host apparatus 30 may be configured to introduce metadata into the double-cropped video frame 14, such as the view direction of the output video frame.

In the illustrated example, the host processor 30 comprises an image signal processor 32. It includes circuitry 60' configured to determine the cropping window 13 for the cropped video frame 12 by analyzing the cropped video frame 10 itself. It also includes circuitry 55' configured to crop of the cropped video frame 12 using a second cropping window 13 to form a double-cropped video frame 14. The operation of circuitry 60' and circuitry 55' may be appreciated, for example, from blocks 60 and 50 of FIGS. 6 to 9.

In the illustrated example of FIG. 4, the host apparatus 30 also comprises a central processing unit 34 and a graphics processing unit 36.

The host apparatus 30 is configured to read from and write to a memory 40 where the double-cropped video frames 14 can be stored for future access.

The host apparatus 30 is configured to provide commands to a display 42, where the double-cropped video frames 14 may be displayed as a video sequence.

The system 37 therefore performs two-phase cropping to obtain digital image stabilization. One phase is performed at the camera module 20 and a second phase is performed at the host apparatus 30.

A rough estimated cropping window 11 is used in the first phase to reduce bandwidth. More accurate digital image stabilization is then performed in the second phase on the resultant cropped video frame 12.

The camera module 20 therefore avoids streaming a very high resolution sequence of video frames from the camera module 20 to the host apparatus 30 for processing.

As an example, if the camera sensor 22 produces a 20 megapixel resolution video frame 10 then for the double-cropped video frame 14 to have a resolution of a high-definition view 1980×1080 p (2 megapixels) the interface 31 can transmit a cropped video frame 12 with significantly less than 20 megapixels e.g. 2 megapixels. If the video frame 10 was not cropped at the camera module 20, there would be increased costs because of increased bandwidth.

Despite the use of high resolution camera sensor 22, because of cropping at the camera module 20, there is no need to use specially designed buses for high bandwidth transport and specially designed processors and memory for high bandwidth digital signal processing. This saves not only potential hardware costs but reduces potential energy consumption of the camera system 37.

Figure 6:
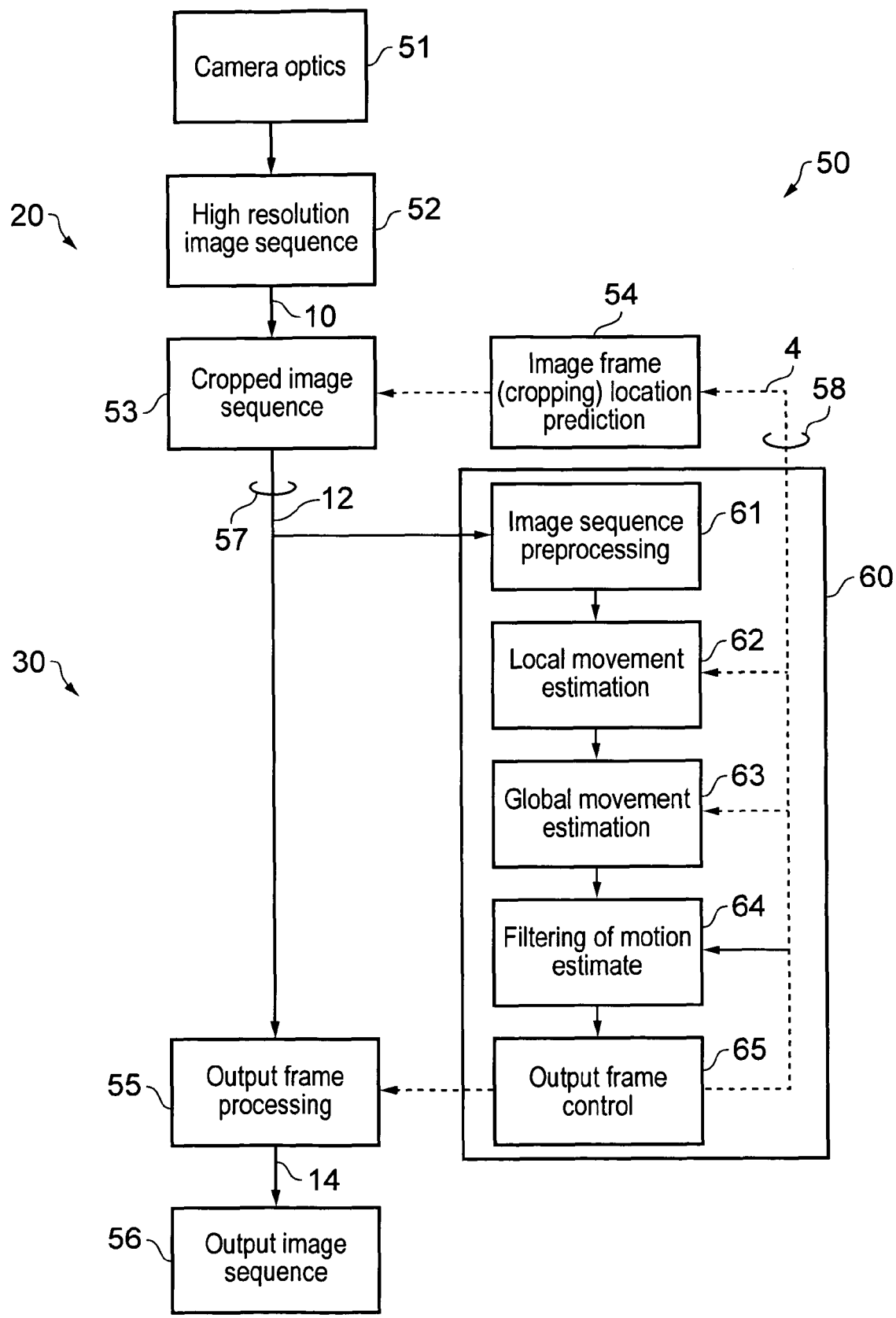
FIG. 6 illustrates an example of a method for performing extreme digital image stabilization.

FIG. 6 illustrates an example of a method 50 for performing extreme digital image stabilization.

At block 51 camera optics may be adjusted to obtain a desired focus and possible optical zoom.

At block 52, a current video frame 10 is captured by the camera sensor 22.

At block 53, the current video frame 10 is cropped using a first cropping window 11 to form a cropped video frame 12.

The cropped video frame 12 is then provided from the camera module 20 to the host apparatus 30.

At block 55 the cropped video frame 12 is further cropped to produce a double-cropped video frame 14. The further crop provides digital image stabilization.

At block 56, the double-cropped video frame 14 is output.

The second further crop is controlled by digital image stabilization block 60. This block controls the position and/or size of the second cropping window 13 used to form the double-cropped video frame 14.

The digital image stabilization block 60 can take many forms. In the illustrated example, image sequence pre-processing occurs at block 61. This may, for example, involve converting a color image to a grayscale image. Next, at block 62, local movement estimation occurs. For example, interest points within the image may be identified. At block 63, global motion estimation occurs. This may involve minimizing a desired cost function.

Next at block 64, the global motion estimates are filtered to ensure smooth repositioning of the second cropping window 13. Filtering is typically context sensitive. Different filtering may be performed depending upon an operational mode.

The digital image stabilization algorithms typically have some empirical thresholds for the differentiation of panning and erratic movement. These thresholds may be adjusted according to the operational mode of the system 37.

For example, for a travel movie mode, the steady rendering of landscape is emphasized over the accurate monitoring of movement. Small scale image stabilization may always occur and large scale image stabilization may be suppressed to allow panning.

For example, for a sports movie (orienteering) mode, it is important to see from headworn video what a participant saw or could have seen during the sports event. The steady rendering of landscape is less important than recording large scale rapid movement of the participant. Small scale image stabilization may always occur and large scale image stabilization may be temporarily suppressed when the system 37 has a large scale movement.

In another example, for the sports movie (mountain biking) mode, the camera system shows how different elevations affect the performance by maintaining horizon at the constant level and the camera view aligned with the movement direction without compensating the natural tilting of the bike when going around corners. This mode provides maximum image stability for comfortable viewing of the video with minimal disturbance from the users' periodic movements such as pedaling.

The above examples illustrate how different applications may have different requirements for digital image stabilization. The benefit of the extreme digital image stabilization system is that large scale image stabilization can be done largely by image cropping 7 so that the digital image stabilization 9 can operate on a more limited amount of image data 12. When the video frame cropping provides predictable cropped video frames the processing load for digital image stabilization becomes more robust and less affected by processing load variations caused by camera movements of different magnitude. Digital image stabilization can save memory bandwidth because it can focus on image stabilization within the cropped frame 12 instead of processing the entire image frame 10.

One or more motion sensors such as, for example, a three-dimensional accelerometer, a gyroscope or an electronic compass may be used to detect sudden changes in motion and/or orientation.

Figure 7:
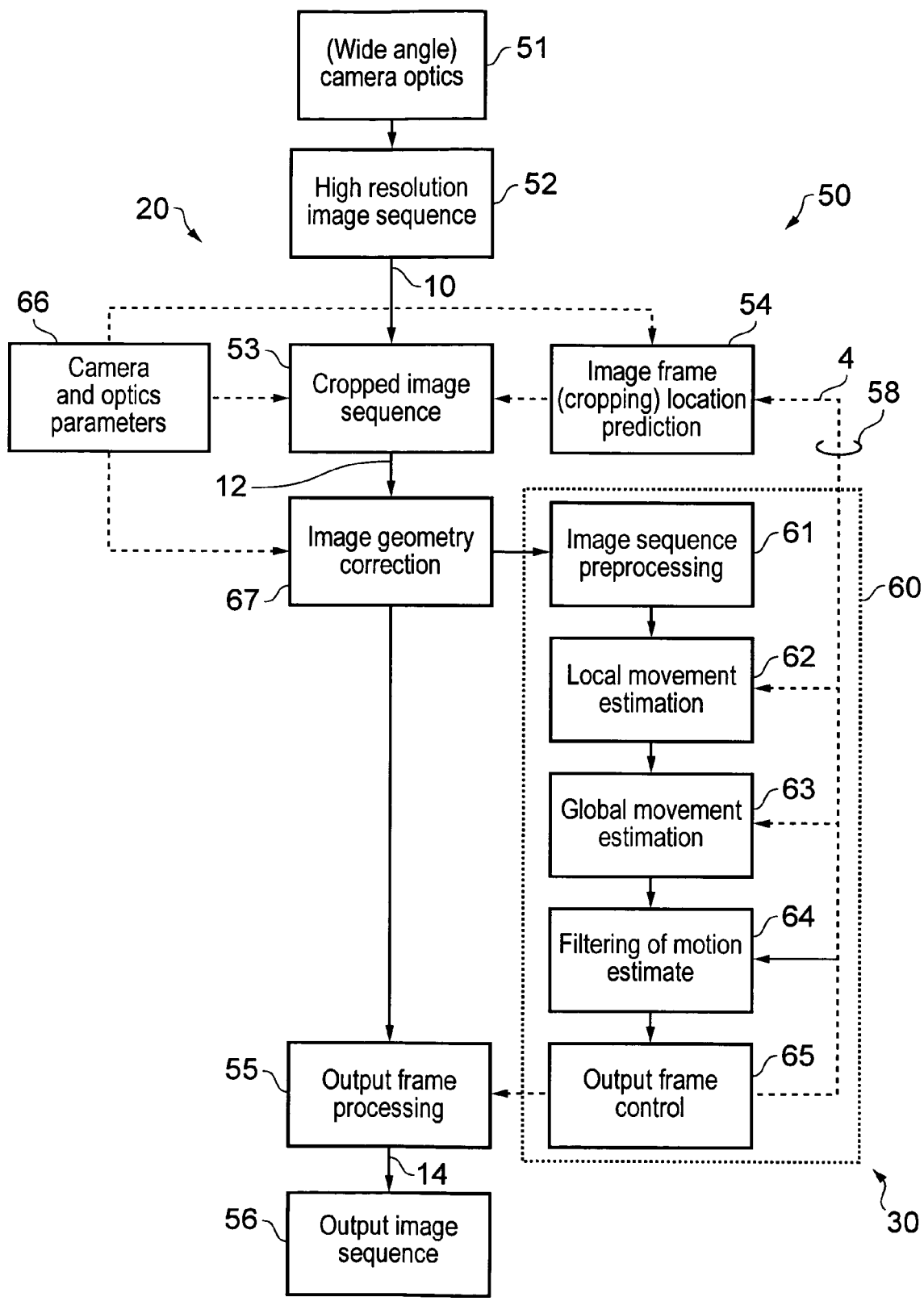
FIGS. 7 and 8 illustrate examples of methods for performing extreme digital image stabilization involving video frames captured using wide angle optics.

FIG. 7 schematically illustrates another example of the method 50. This method is similar to the method described with reference to FIG. 6 and like references are used to denote like features. The description of the operation of the method 50 given in relation to FIG. 6 is also relevant to FIG. 7 and will not be repeated here. Emphasis will instead be placed on how the method 50 illustrated in FIG. 7 differs from the method 50 illustrated in FIG. 6.

The optics used at block 51 are, in this example, wide angle optics which increase the field of view (FoV) of the current video frame 10. This provides a greater area on which to perform the two-phase cropping. An example of such wide angle optics are fisheye lens providing 180 degrees FoV and panoramic optics providing 360 degrees horizontal FoV.

In this example, the cropped video frame 12 is corrected at block 67 to correct distortion introduced by the wide angle optics at block 51. The block 67 may be positioned either in the camera module 20 or the host apparatus 30 so that it corrects the cropped video frame 12.

Camera and optics parameters are provided, at block 66, to block 54 and block 67. At block 54, the parameters influence the position of the first cropping window 11. At block 67, the parameters control the image geometry correction applied.

Figure 8:
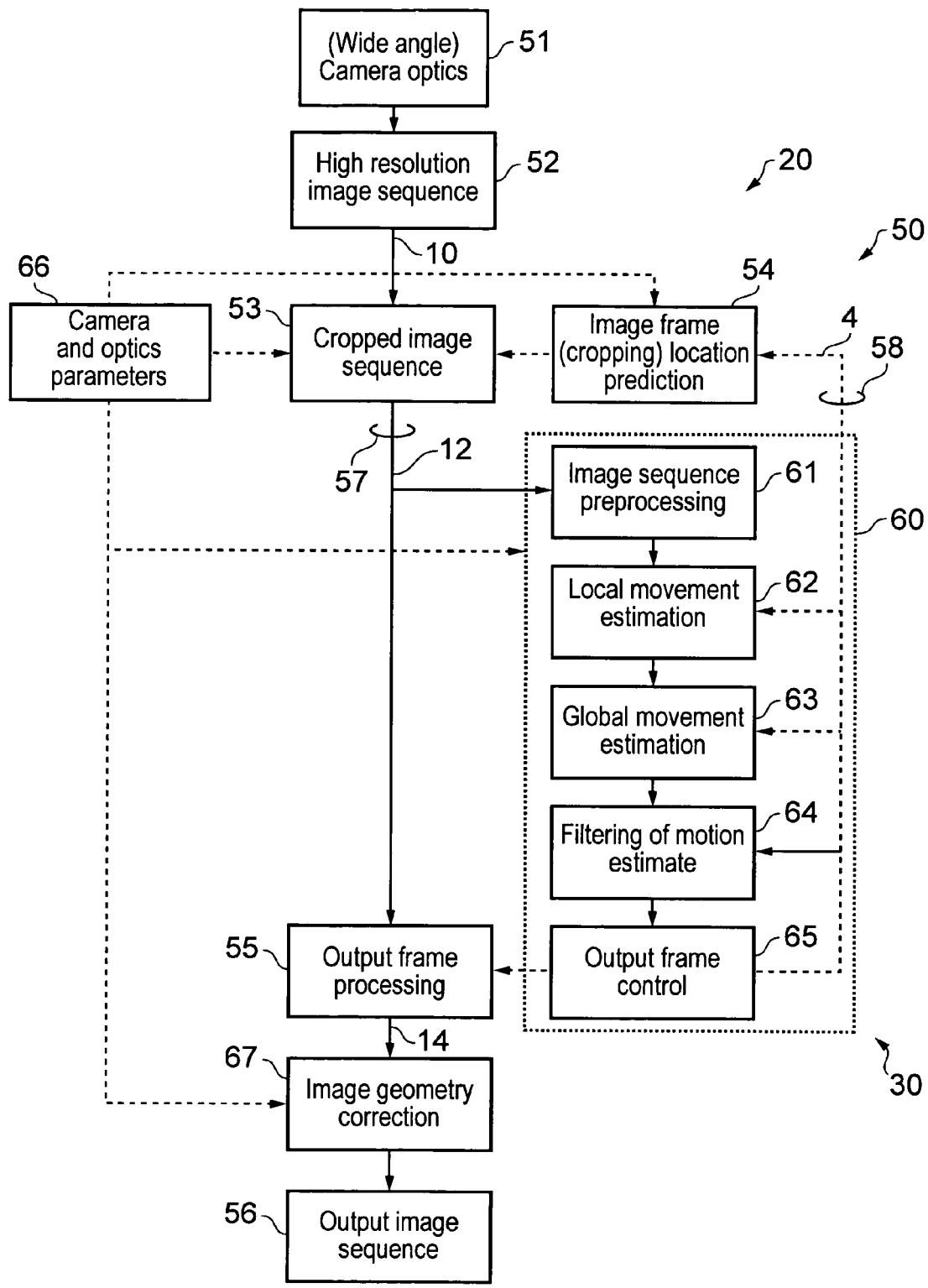

As an alternative, as illustrated in FIG. 8, block 67 may be positioned in the host apparatus 30 after block 55 so that so that it corrects the double-cropped image 14. This is a different implementation compared to FIG. 7 since digital image stabilization at block 60 occurs on a distorted cropped video frame 12.

Figure 9:
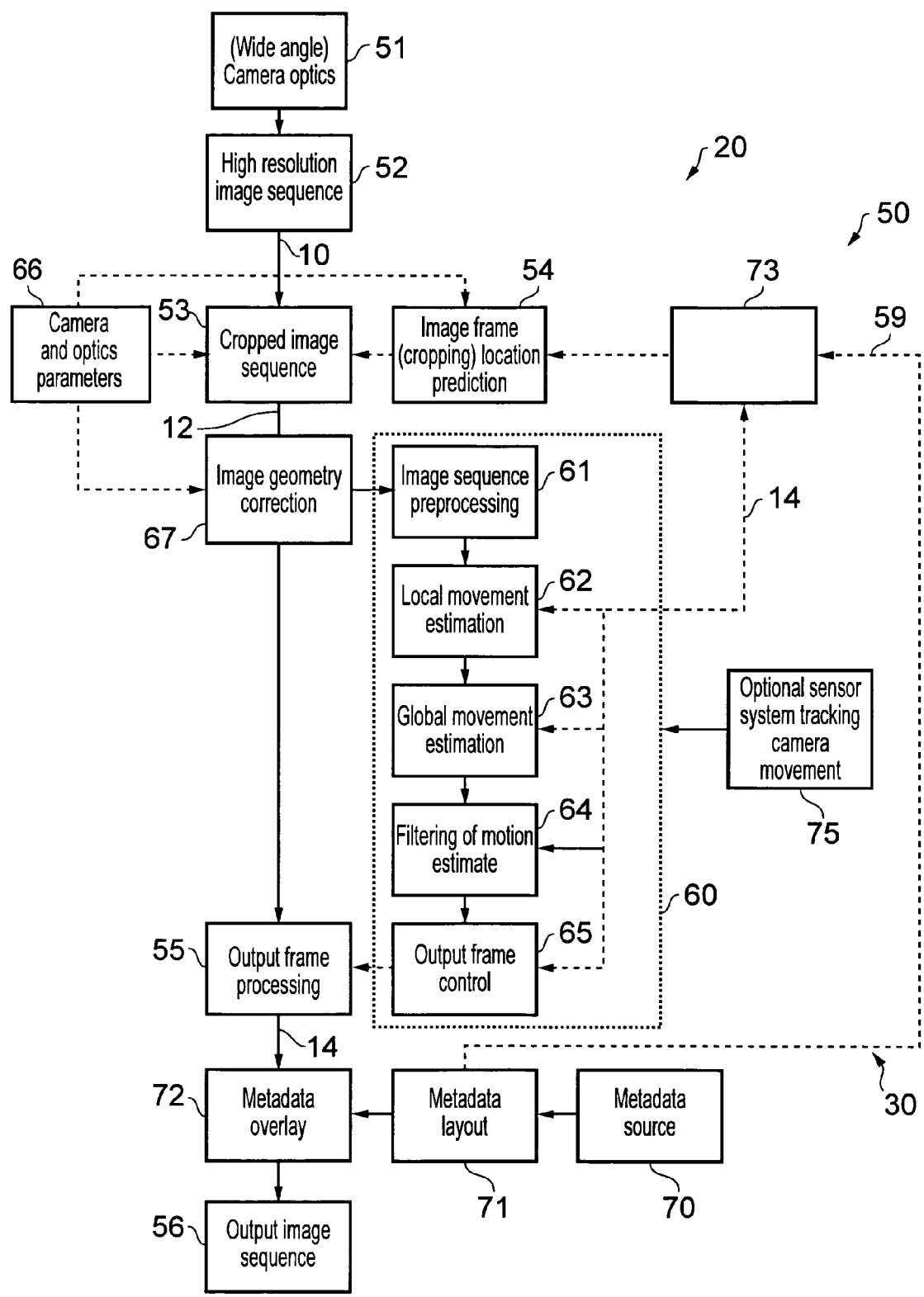
FIG. 9 illustrates an example of a method for performing extreme digital image stabilization and metadata overlay.

FIG. 9 schematically illustrates another example of the method 50. This method is similar to the method described with reference to FIG. 6 as augmented in FIG. 7 and like references are used to denote like features. The description of the operation of the method 50 given in relation to FIG. 6 is also relevant to FIG. 9 and will not be repeated here. The description of the operation of the blocks 66 and 67 given in relation to FIG. 7 is also relevant to FIG. 9 and will not be repeated here. Emphasis will instead be placed on how the method 50 illustrated in FIG. 9 differs from the method 50 illustrated in FIG. 7.

At block 70 a metadata source outputs metadata. The metadata may be any suitable information. It may, for example, be a compass bearing, a positioning coordinate, a speed, a time elapsed, map data, etc.

At block 71, metadata layout composition is performed using the metadata from the metadata source. This block determines where in the double-cropped video frame 14 the metadata should be positioned. It may be positioned so that it does not obscure the region of interest.

At block 72, the metadata is overlaid onto the double-cropped video frame 14.

At block 73, metadata alignment adjustment is performed to adjust the first cropping window 11 determination at block 54. The adjustment is performed on the basis of where in the double-cropped video frame 14 the metadata will be positioned as determined at block 71. The first cropping window 11 may be adjusted to avoid metadata overlaying the region of interest at block 72. The first cropping window 11 may be sufficiently larger than the region of interest to enable metadata to be displayed adjacent the region of interest.

In this way, complicated metadata that cannot be implemented with conventional subtitle technologies can be added to video frames. The metadata is added to the double-cropped video frame 14 before image coding (e.g. video compression). Metadata is not restricted to one specific data type but refers to auxiliary data that can be embedded into a video frame. An example of metadata could be e.g. Picture In Picture (PIP) overlay of a secondary video stream from a secondary camera, which can be embedded into double-cropped video frame or a geographical map view of a current location into the video frame.

At block 75 an optional sensor system is illustrated which may be used to track camera movement. As previously described this may be used during the digital image stabilization at block 60, for example, to control filtering at block 64. The sensor system may include associated processing blocks that produce an estimate of the movement of the camera system.

The cropping circuitry 26 in the camera module 20 may be implemented using instructions that enable hardware functionality, for example, by using executable computer program instructions in a general-purpose or special-purpose processor that may be stored on a computer readable storage medium (disk, memory etc) to be executed by such a processor.

Figure 5:
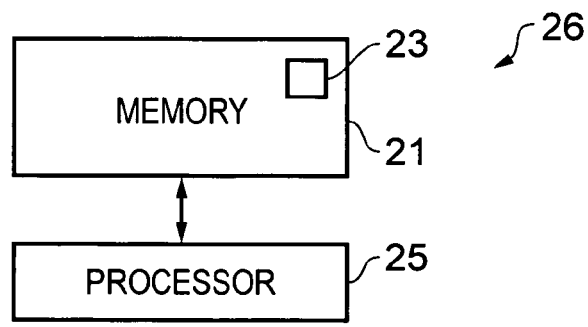
FIG. 5 illustrates an example of cropping circuitry.

Referring to FIG. 5 as an example, the cropping circuitry 26 may comprise a processor 25 and a memory 21. The processor 25 is configured to read from and write to the memory 21. The processor 25 may also comprise an output interface via which data and/or commands are output by the processor and an input interface via which data and/or commands are input to the processor 25.

The memory 21 stores a computer program 23 comprising computer program instructions that control the operation of the cropping circuitry 26 when loaded into the processor 25. The computer program instructions 23 provide the logic and routines that enables the apparatus to perform the methods illustrated in FIGS. 1, 2, and 6 to 9. The processor 25 by reading the memory 21 is able to load and execute the computer program 23.

The camera module may therefore comprise: at least one processor 25; and at least one memory 21 including computer program code 23, the at least one memory 21 and the computer program code 23 configured to, with the at least one processor 25, cause the camera module 20 at least to perform for each video frame in a series of video frames:

receiving cropping information 4 for a current video frame 10;

dynamically adjusting a first cropping window 11 in response to the cropping information 4;

performing a first crop of the current video frame 10 using the first cropping window 11 to form a cropped video frame 12; and sending the cropped video frame 12 for digital image stabilization.

In an alternative implementation, instead of using the first cropping window 11 to crop the current video frame 10 after capture, the cropping window 11 is used to control capture of the current video 10. Referring to FIG. 4, the cropping control circuitry 26 may control the camera control circuitry 24 to enable only a subset of sensor elements present in the camera sensor. The subset of enabled sensor elements would correspond to the cropping window 11. The cropped video frame 12 is therefore captured directly at the camera sensor 22.

In this implementation, the camera module may therefore comprise: at least one processor 25; and at least one memory 21 including computer program code 23, the at least one memory 21 and the computer program code 23 configured to, with the at least one processor 25, cause the camera module 20 at least to perform for each video frame in a series of video frames:

receiving cropping information 4 for a video frame;

capturing at a camera sensor 22 a cropped video frame 12; and sending the cropped video frame 12 for digital image stabilization.

The computer program 23 may arrive at the system 37 via any suitable delivery mechanism. The delivery mechanism may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 23. The delivery mechanism may be a signal configured to reliably transfer the computer program 23. The system 37 may propagate or transmit the computer program 23 as a computer data signal.

Although the memory 21 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor', 'circuitry' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

As used here 'module' refers to a unit or apparatus that excludes certain parts/components that would be added by an end manufacturer or a user.

The definition of 'video' refers to an image sequence where consecutive image frames may be of different size and image capture interval may also vary over time.

The blocks illustrated in the FIG. 1 may represent steps in a method and/or sections of code in the computer program 23. The illustration of a particular order to the blocks does not necessarily imply that there is a required or preferred order for the blocks and the order and arrangement of the block may be varied. Furthermore, it may be possible for some blocks to be omitted.

Although embodiments of the present invention have been described in the preceding paragraphs with reference to various examples, it should be appreciated that modifications to the examples given can be made without departing from the scope of the invention as claimed.

The description focuses on video stabilization of a single video stream but could be applied to multi-camera systems where multiple cameras are either mechanically coupled together, such as in a stereoscopic video camera, or for example wearable multi-camera system.

In multi-camera systems where different camera modules are mechanically coupled and have known relative field of views the cropping information can be utilized jointly because camera modules cannot move independently. One such example is a stereoscopic camera system where the cropping information can be largely reused for both left and right camera since the stereo camera has known camera configuration and parallax. The cropping information may comprise size and the location constraints for the first cropping window. Also the video stabilization is synchronized for both left and right view so that the video stabilization does not disturb the stereo effect. It is also known in the art that image cropping interacts with the depth effect introducing additional constraints for stereoscopic image stabilization. However the proposed structure can be adapted to stereoscopic image stabilization by following the constraints known in the art of stereo imaging. Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. A method comprising:
receiving cropping information, at a camera module for cropping a current video frame, from a host apparatus;
capturing at a camera sensor of the camera module the current video frame;
performing a first crop of the current video frame using a first cropping window to form a cropped video frame, wherein the first cropping window is dynamically adjusted in response to the received cropping information; and
sending, via an interface, the cropped video frame to the host apparatus for digital image stabilization;
using processing performed by the host apparatus to identify a second cropping window for the cropped video frame to at least partially generate cropping information for a subsequent current video frame.

2. A method as claimed in claim 1, wherein the method is performed at the camera module comprising:
the interface, which comprises an input interface configured to receive cropping information for the current video frame from the host apparatus;
the camera sensor configured to capture the current video frame;
cropping circuitry configured to crop the current video frame using the first cropping window to form a cropped video frame, wherein the first cropping window is dynamically adjusted in size in response to the received cropping information; and
the interface also comprises an output interface configured to send the cropped video frame for digital image stabilization in the host apparatus.

3. A method as claimed in claim 1, wherein the received cropping information is dependent upon one or more preceding video frames but not the current video frame.

4. A method as claimed in claim 1, wherein the cropping information defines a variable size of the first cropping window that is sufficiently larger than a region of interest to enable digital image stabilization of the region of interest.

5. A method as claimed in claim 1, wherein the cropping information defines a size of the first cropping window that is sufficiently larger than a region of interest to enable metadata to be displayed adjacent the region of interest.

6. A method as claimed in claim 1, further comprising: performing, as part of digital image stabilization, a second crop of the cropped video frame using the second cropping window to form a double-cropped video frame.

7. A method as claimed in claim 6, further comprising: determining the second crop by analyzing the current video frame.

8. A method as claimed in claim 1, wherein the cropping information identifies a cropping window used in digital image stabilization of a video frame preceding the current video frame.

9. A method as claimed in claim 1, wherein the cropping information comprises a variable size and location constraints for the first cropping window.

10. A method as claimed in claim 6, comprising introducing metadata into the double-cropped image.

11. A method as claimed in claim 1, comprising:
for each video frame in a sequence of video frames:
 capturing a current video frame;
 receiving cropping information for the current video frame;
 dynamically adjusting a first cropping window in response to the cropping information;
 performing a first crop of the current video frame using the first cropping window to form a cropped video frame; and
 sending via a physical interface the cropped video frame for digital image stabilization.

12. An apparatus comprising:
a camera sensor configured to capture a current video frame;
cropping circuitry configured:
 to receive cropping information for cropping the current video frame;
 to define a variable size of a first cropping window in response to the cropping information;
 to crop the current video frame using the first cropping window to form a cropped video frame; and
 to send the cropped video frame for digital image stabilization at a host apparatus, the host apparatus is configured to re-use processing performed to identify a second cropping window for the cropped video frame to at least partially generate cropping information for a subsequent current video frame.

13. An apparatus as claimed in claim 12, wherein the apparatus is a camera module for use with a host apparatus comprising:
an input interface configured to receive cropping information for a current video frame from the host apparatus;
the camera sensor configured to capture the current video frame; and
cropping circuitry configured to crop the current video frame using a first cropping window to form a cropped video frame, wherein the first cropping window has been dynamically adjusted in size in response to the received cropping information; and
an output interface configured to send the cropped video frame for digital image stabilization in the host apparatus.

14. An apparatus as claimed in claim 12, wherein the cropping information is dependent upon one or more preceding video frames but not the current video frame.

15. A system comprising an apparatus as claimed in claim 12 and a host apparatus configured to perform, as part of digital image stabilization, a crop of the cropped video frame using the second cropping window to form a double-cropped video frame.

16. A system as claimed in claim 15, wherein the host apparatus is configured to determine the second crop by analyzing the current video frame.

17. A system as claimed in claim 15, wherein the cropping information identifies a cropping window used in digital image stabilization of a video frame preceding the current video frame.

18. A system as claimed in claim 15, wherein the host apparatus is configured to introduce metadata into the double-cropped image.

19. A system as claimed in claim 15, wherein the system is a wearable video camera system.

20. An apparatus comprising: at least one processor; and at least one non-transitory memory including computer program code, the at least one non-transitory memory and the computer program code configured to, with the at least one processor, cause a camera module at least to perform for each video frame in a series of video frames:
 receiving cropping information for cropping a current video frame;
 dynamically adjusting a first cropping window in response to the cropping information;
 performing a first crop of the current video frame using the first cropping window to form a cropped video frame; and
 sending via an interface the cropped video frame to a host apparatus for digital image stabilization, the host apparatus is configured to re-use processing performed to identify a second cropping window for the cropped video frame to at least partially generate cropping information for a subsequent current video frame.

21. The method as claimed in claim 1, further comprising:
performing a second crop of a subsequent video frame using the second cropping window to form a double cropped video frame, wherein the second cropping window is dynamically adjusted in size relative to the first cropping window.

* * * * *